United States Patent
Koiso

(10) Patent No.: US 11,551,446 B2
(45) Date of Patent: Jan. 10, 2023

(54) VIDEO DETECTION DEVICE, AND VIDEO DETECTION METHOD

(71) Applicant: JVCKENWOOD Corporation, Yokohama (JP)

(72) Inventor: Hisashi Koiso, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/314,323

(22) Filed: May 7, 2021

(65) Prior Publication Data

US 2021/0264156 A1  Aug. 26, 2021

Related U.S. Application Data

(63) Continuation of application No. PCT/JP2019/035304, filed on Sep. 9, 2019.

(30) Foreign Application Priority Data

Nov. 9, 2018 (JP) .............................. JP2018-211631

(51) Int. Cl.
G06V 20/40 (2022.01)
G06V 10/24 (2022.01)
G06V 40/19 (2022.01)
G06V 40/20 (2022.01)
G06V 40/16 (2022.01)

(52) U.S. Cl.
CPC ............ *G06V 20/40* (2022.01); *G06V 10/242* (2022.01); *G06V 40/171* (2022.01); *G06V 40/19* (2022.01); *G06V 40/20* (2022.01)

(58) Field of Classification Search
CPC ...... G06V 20/40; G06V 40/171; G06V 40/19; G06V 40/20; G06V 10/242
See application file for complete search history.

(56) References Cited

U.S. PATENT DOCUMENTS

2014/0139655 A1\*  5/2014  Mimar ............... G08B 21/0476
                                                               340/575
2016/0054794 A1\*  2/2016  Yu ........................... G06F 3/017
                                                               345/156

FOREIGN PATENT DOCUMENTS

JP    H07296299 A    11/1995
JP    2003319169 A   11/2003
JP    2006163900 A *  6/2006

OTHER PUBLICATIONS

"Visual Analysis of Eye State and Head Pose for Driver Alertness Monitoring" by Ralph, 3, Sep. 2013. (Year: 2013).*
English Translation of JP2006163900, Iwamoto, Jun. 2006. (Year: 2006).*

(Continued)

*Primary Examiner* — Syed Haider
(74) *Attorney, Agent, or Firm* — Brundidge & Stanger, P.C.

(57) ABSTRACT

A video detection device includes a video acquisition interface, a video recognition interface, and a tilt angle estimation interface. The video acquisition interface acquires a video of the face of an imaging subject. The video recognition interface recognizes the left and right eyes from the video acquired by the video acquisition interface. The tilt angle estimation interface estimates a tilt angle with respect to the horizontal based on the position of the left and right eyes recognized by the video recognition interface.

7 Claims, 6 Drawing Sheets

(56) References Cited

OTHER PUBLICATIONS

International Preliminary Report on Patentability from International Application No. PCT/JP2019/035304 dated May 11, 2021, 11 pages.
International Search Report from International Application No. PCT/JP2019/035304 dated Oct. 29, 2019, 4 pages.

* cited by examiner ized by the video recognition interface, wherein the tilt angle estimation interface estimates the tilt angle by practicing at least one of obtaining a difference between video frames and performing averaging between the video frames.

VIDEO DETECTION DEVICE, AND VIDEO DETECTION METHOD

CROSS-REFERENCE TO RELATED APPLICATION

This application is a continuation of application No. PCT/JP2019/035304, filed on Sep. 9, 2019, and claims the benefit of priority from the prior Japanese Patent Application No. 2018-211631, filed on Nov. 9, 2018, the entire content of which is incorporated herein by reference.

BACKGROUND OF THE INVENTION

1. Field of the Disclosure

The present invention relates to a video detection device, a video detection method, and a recording medium for video detection.

2. Description of the Related Art

For example, in a drive recorder or the like mounted on a vehicle, a video obtained by imaging the outside or the inside of the vehicle is stored in a storage device. When the inside of the vehicle is imaged, the condition of the inside of the vehicle is stored as a video, and the video is stored while focusing on the driver.

For example, Patent Literature 1 discloses an image processing method for detecting respective positions corresponding to the eyes of a person in an original image based on image data of the original image including a face area corresponding to the face of a person to be imaged. In this image processing method, the original image is corrected such that the detected positions corresponding to the eyes of the person in the original image are located on the same straight line parallel to a reference line that is preset for the original image or a straight line that is perpendicular to the reference line so as to generate corrected image data. This image processing method automatically corrects the tilting of the face area corresponding to the face of a person in the original image and is used for, for example, creating an ID photo.

[Patent Literature 1] Japanese Patent Application Publication No. 2003-319169

SUMMARY OF THE INVENTION

The conventional image processing method described in Patent Literature 1 is considered to detect the position of the left and right eyes in a still image such as an ID photo and correct the image. However, the method is not considered to be applied to a video acquired as a moving image. Further, in the conventional image processing method, estimation of the condition of an imaging subject based on the movement of the eyes such as the eye openness and tilting of the left and right eyes recognized from a video is not considered.

In this background, a purpose of the present invention is to provide a video detection device, a video detection method, and a recording medium for video detection program capable of estimating the tilt of the left and right eyes from moment to moment from a video in which the face of an imaging subject is captured and further estimating the condition of the imaging subject.

A video detection device according to an embodiment includes: a video acquisition interface that acquires a video in which the face of an imaging subject is captured; a video recognition interface that recognizes the left and right eyes in the video acquired by the video acquisition interface; and a tilt angle estimation interface that estimates a tilt angle with respect to the horizontal based on the position of the left and right eyes recognized by the video recognition interface, wherein the tilt angle estimation interface estimates the tilt angle by practicing at least one of obtaining a difference between video frames and performing averaging between the video frames.

A video detection device according to another embodiment includes: a video acquisition interface that acquires a video in which the face of an imaging subject is captured; a video recognition interface that recognizes the left and right eyes in the video acquired by the video acquisition interface; a tilt angle estimation interface that estimates a tilt angle with respect to the horizontal based on the position of the left and right eyes recognized by the video recognition interface; and a tilt frequency calculation interface that calculates a frequency at which the tilt angle estimated by the tilt angle estimation interface exceeds a predetermined angle.

Another embodiment relates to a video detection method. This video detection method includes: acquiring a video in which the face of an imaging subject is captured; a video recognition module that recognizes the left and right eyes in the video acquired in the video acquisition module; and a tilt angle estimation module that estimates a tilt angle with respect to the horizontal based on the position of the left and right eyes recognized in the video recognition module, wherein the tilt angle is estimated by practicing at least one of obtaining a difference between video frames and performing averaging between the video frames in the estimating a tilt angle.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
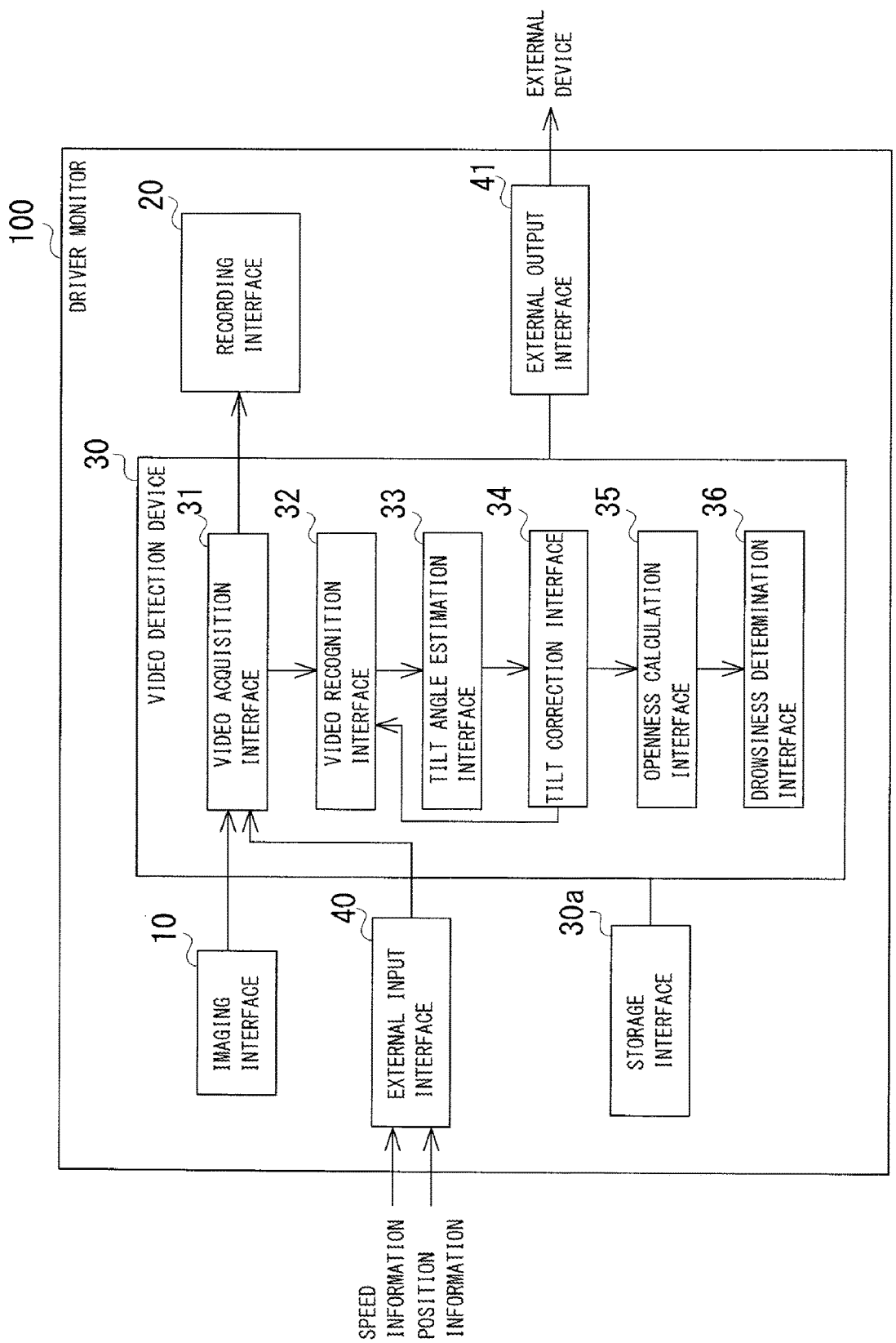
FIG. 1 is a block diagram showing the configuration of a driver monitor including a video detection device according to the first embodiment.

The invention will now be described by reference to the preferred embodiments. This does not intend to limit the scope of the present invention, but to exemplify the invention.

Hereinafter, the present invention will be described based on preferred embodiments with reference to FIGS. 1-7. The same or equivalent constituting elements and members illustrated in each drawing shall be denoted by the same reference numerals, and duplicative explanations will be omitted appropriately. The dimensions of members illustrated in each drawing are appropriately enlarged or reduced for easier understanding. Some of members not important for describing the embodiments are omitted from each drawing.

First Embodiment

FIG. 1 is a block diagram showing the configuration of a driver monitor 100 including a video detection device 30 according to the first embodiment. The driver monitor 100 is mounted on a vehicle and images the inside of the vehicle in a temporally continuous manner. The driver monitor 100 may record a captured video or may discard the captured video without recording. The driver monitor 100 is arranged, for example, on a dashboard below the windshield of the vehicle. The video detection device 30 of the driver monitor 100 captures an image of, for example, a driver riding the vehicle as an imaging subject and recognizes the left and right eyes from the imaged face of the imaging subject. The video detection device 30 estimates the tilt angle of the left and right eyes with respect to the horizontal (hereinafter, the tilt angle with respect to the horizontal is simply referred to as tilt angle) from moment to moment.

The video detection device 30 performs rotation correction on the tilt of the left and right eyes such that the left and right eyes are substantially arranged horizontally based on the estimated tilt angle of the left and right eyes. The video detection device 30 calculates the openness of the left and right eyes on which the rotation correction has been performed and determines the degree of drowsiness from the calculated openness. Further, the video detection device 30 calculates the frequency at which the tilt angle of the left and right eyes exceeds a predetermined angle and determines the degree of drowsiness from the calculated frequency.

The video detection device 30 may perform the rotation correction on the captured video itself such that the left and right eyes are substantially arranged horizontally based on the estimated tilt angle of the left and right eyes. Further, in the captured video, the rotation correction may be performed on only a face detection frame or on the face detection frame and the image of a peripheral portion thereof. Alternatively, the rotation correction may be performed using other facial parts other than the left and right eyes. Further, the video detection device 30 may output information such as the estimated tilt angle of the left and right eyes, the openness of the left and right eyes, and the frequency at which the tilt angle of the left and right eyes exceeds the predetermined angle to an external device. Further, the video detection device 30 may record the information as information accompanying the video to be recorded.

The driver monitor 100 includes an imaging interface 10, a recording interface 20, a video detection device 30, an external input interface 40, an external output interface 41, and the like. The imaging interface 10 is, for example, a camera having a detector such as a CCD and images, for example, a driver riding a vehicle as an imaging subject. The imaging interface 10 acquires a video in a temporally continuous manner and transmits the video to a video acquisition interface 31 of the video detection device 30, which will be described later.

The recording interface 20 is, for example, a removable medium such as an SD card or a USB memory, a hard disk, or the like and is capable of recording and deleting a video acquired by the video acquisition interface 31. Hereinafter, a configuration in which the recording interface 20 is provided will be described. However, if the driver monitor 100 does not have a part that records a video, the recording interface 20 does not need to be provided. By allowing the recording interface 20 to be attached to and detached from the driver monitor 100, the recording interface 20 can be removed from the driver monitor 100, and the video can be, for example, played back on another PC or the like.

The external input interface 40 acquires speed information, position information, and the like of a vehicle from an external device. Further, the external output interface 41 outputs information such as the estimated tilt angle of the left and right eyes, the openness of the left and right eyes, and the frequency at which the tilt angle of the left and right eyes exceeds the predetermined angle to an external device. The driver monitor 100 may add the speed information, the position information, and the like acquired by the external input interface 40 to the video and record the speed information, the position information, and the like.

The video detection device 30 has a video acquisition interface 31, a video recognition interface 32, a tilt angle estimation interface 33, a tilt correction interface 34, an openness calculation interface 35, and a drowsiness determination interface 36. The video detection device 30 comprises, for example, a CPU or the like and operates according to a computer program so as to thereby execute processes performed by each of the above-mentioned interfaces. A storage interface 30a comprises a data storage device such as a random access memory (RAM), a flash memory, and a hard disk storage device, and stores a computer program or the like executed by the video detection device 30. Further, the storage interface 30a stores a recognition dictionary for recognizing the face, eyes, and the like of the imaging subject from a captured video.

The video acquisition interface 31 acquires the video captured by the imaging interface 10, performs a process such as data compression, and outputs the video to the recording interface 20. The video acquisition interface 31 may be formed to include the imaging interface 10.

The video recognition interface 32 recognizes the face and the left and right eyes of the imaging subject from the video input from the video acquisition interface 31 based on the recognition dictionary stored in the storage interface 30a. The recognition dictionary stored in the storage interface 30a includes shape data of faces, eyes, and the like, and the video recognition interface 32 recognizes the left and right eyes by extracting the shape pattern expressed in the video and checks the shape pattern against the shape data included in the recognition dictionary. The video recognition interface 32 can recognize the left and right eyes from the video by using a known image recognition process method developed in various fields.

Figure 2:
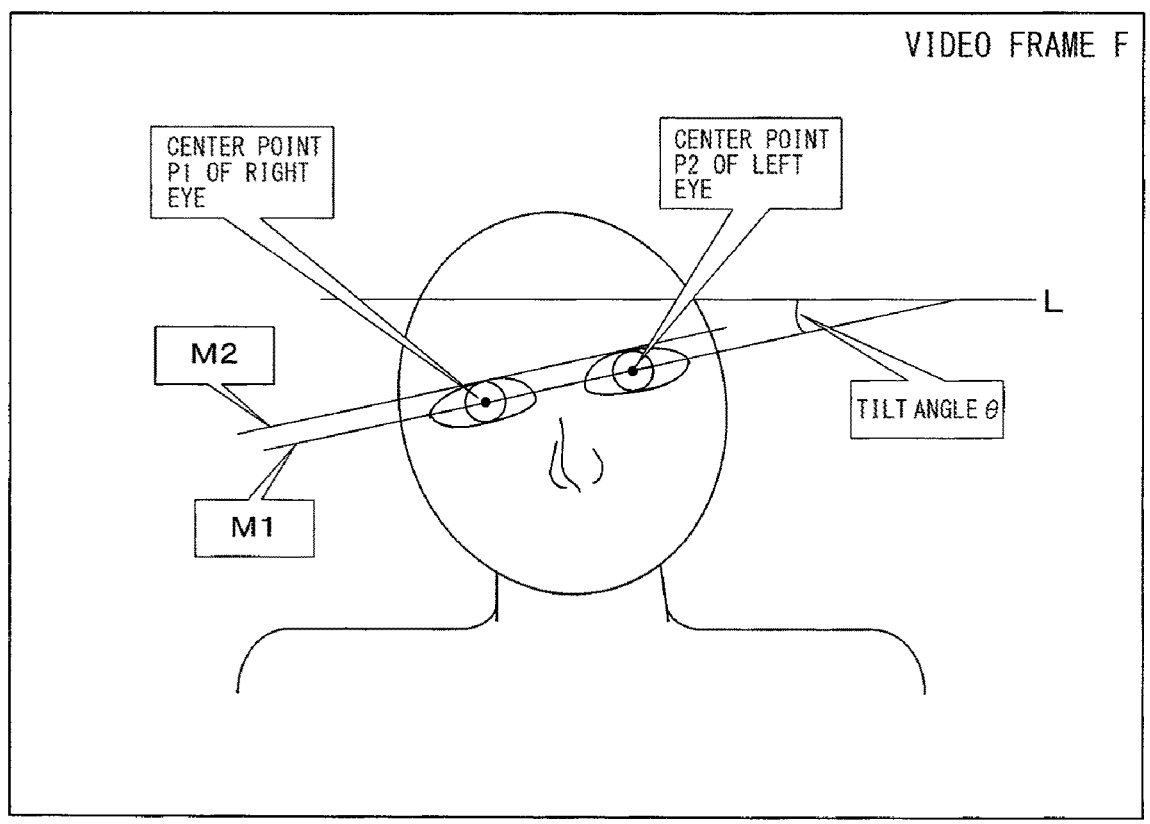
FIG. 2 is a schematic diagram for explaining the tilt of the left and right eyes in a video frame.

The tilt angle estimation interface 33 estimates the tilt angle of the left and right eyes moment by moment based on the position of the left and right eyes recognized by the video recognition interface 32. FIG. 2 is a schematic diagram for explaining the tilt of the left and right eyes in a video frame. The tilt angle estimation interface 33 obtains the center points P1 and P2 of the left and right eyes and estimates the angle formed by a straight line M1 connecting the center points P1 and P2 and a horizontal line L serving as a reference line in a video frame F as a tilt angle θ. The center points P1 and P2 of the left and right eyes are obtained as the center points of the pupils of the left and right eyes recognized by the video recognition interface 32.

The straight line M1 indicates the direction in which the left and right eyes are lined up. For example, as shown in FIG. 2, a straight line M2 indicating a tangent line in the contour of the eyes may be obtained, and the angle formed by the straight line M2 and the horizontal line L may be estimated as the tilt angle θ. In addition, a straight line connecting the outer corners of the left and right eyes, a straight line connecting the inner corners of the eyes, and the like may be obtained, and the angle formed by these straight lines and the horizontal line L may be estimated as the tilt angle θ.

The tilt angle estimation interface 33 may independently estimate the tilt angle θ of the left and right eyes for each continuous video frame. Further, the tilt angle estimation interface 33 may perform rotation correction on the current video frame using a tilt angle θ(n−1) in the immediately preceding video frame and recognize the left and right eyes by the video recognition interface 32. The tilt angle estimation interface 33 may then calculate the amount of change Δθ(n) of the tilt angle and estimate a tilt angle θ(n) in the present video frame. At this time, the tilt angle θ(n) is expressed as follows.

$$\theta(n)=\theta(n-1)+\Delta\theta(n)$$

By once performing rotation correction on the current video frame using θ(n−1), the tilt of the left and right eyes becomes smaller allowing video recognition to be easier. Thus, the amount of change Δθ(n) can be obtained more accurately.

Further, the tilt angle estimation interface 33 may estimate the tilt angle of the left and right eyes by performing averaging between consecutive video frames. When the left and right eyes move minutely causing a slight change in the tilt angle, a large movement of the left and right eyes is easily grasped by averaging the tilt angles of the left and right eyes between video frames.

Further, when at least one of the left and right eyes is not recognized in a video for a predetermined period of time and the tilt angle cannot be estimated, the tilt angle estimation interface 33 may reset the estimated tilt angle using a tilt angle estimated based on the position of the left and right eyes that is recognized next. Further, when at least one of the left and right eyes moves out of the angle of view of the imaging interface 10, the tilt angle estimation interface 33 may keep a tilt angle estimated immediately before at least one of the left and right eyes moves out of the angle of view in case the left and right eyes can be detected in the angle of view immediately after moving out of the angle of view for an instant.

Figure 3:
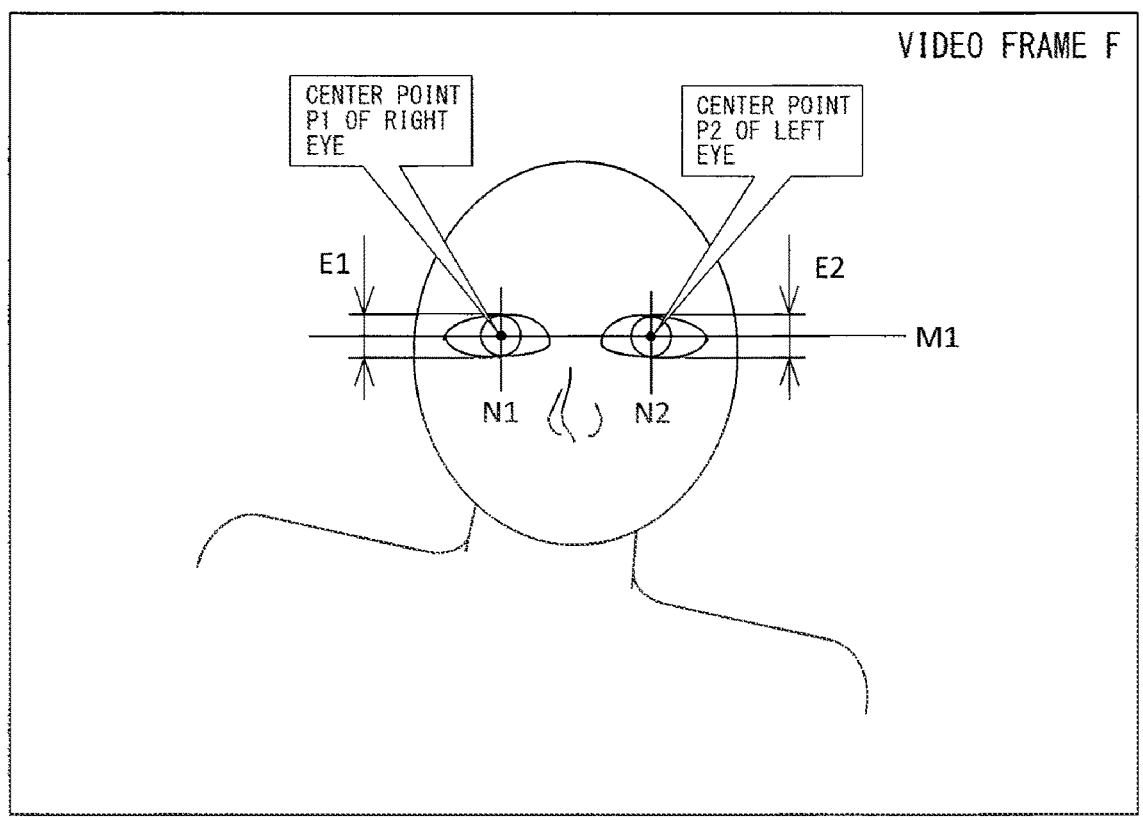
FIG. 3 is a schematic diagram for explaining the left and right eyes on which rotation correction has been performed.

The tilt correction interface 34 performs rotation correction on the left and right eyes based on the tilt angle θ estimated by the tilt angle estimation interface 33 such that the left and right eyes are arranged in parallel with the horizontal line L, which is the reference line in the video frame F. FIG. 3 is a schematic diagram for explaining the left and right eyes on which the rotation correction has been performed. The tilt correction interface 34 performs the rotation correction integrally on the left and right eyes such that the straight line M1 indicating the alignment direction of the left and right eyes becomes the horizontal line, which is the reference line in the video frame F.

The openness calculation interface 35 calculates the openness of the left and right eyes on which the rotation correction has been performed by the tilt correction interface 34. As shown in FIG. 3, the openness calculation interface 35 obtains a distance E1 between a vertical line N1 passing through the center point P1 of the right eye and the intersection of the upper edge part and the lower edge part of the right eye. In the same way, the openness calculation interface 35 obtains a distance E2 between a vertical line N2 passing through the center point P2 of the left eye and the intersection of the upper edge part and the lower edge part of the left eye. The openness calculation interface 35 may define the distances E1 and E2 as the openness or measures an average distance En in the imaging subject and define an E1/En ratio and an E2/En ratio as the openness. Further, the openness calculation interface 35 may, for example, measure the maximum distance Em in the imaging subject and define an E1/Em ratio and an E2/Em ratio as the openness.

The drowsiness determination interface 36 determines the degree of drowsiness occurring in the imaging subject based on left and right eye movements recognized by the video recognition interface 32. The drowsiness determination interface 36 determines the degree of drowsiness based on the openness of the left and right eyes calculated by the openness calculation interface 35. For example, the drowsiness determination interface 36 sets a predetermined threshold value for the openness of the left and right eyes and determines that the degree of drowsiness is "small" when the openness is equal to or more than the threshold value and that the degree of drowsiness is "large" when the openness is less than the threshold value. Further, the drowsiness determination interface 36 may set a plurality of (two or more) threshold values for the openness of the left and right eyes and determine the degree of drowsiness in multiple stages. Further, the drowsiness determination interface 36 may determine the openness of the left and right eyes as the degree of drowsiness.

The video acquired by the video acquisition interface 31 is recorded by the recording interface 20 after performing a video process such as data compression as described above. Alternatively, the video may be recorded after the rotation correction is performed by the recording interface 20 based on the tilt angle of the left and right eyes estimated moment by moment by the tilt angle estimation interface 33.

Figure 4:
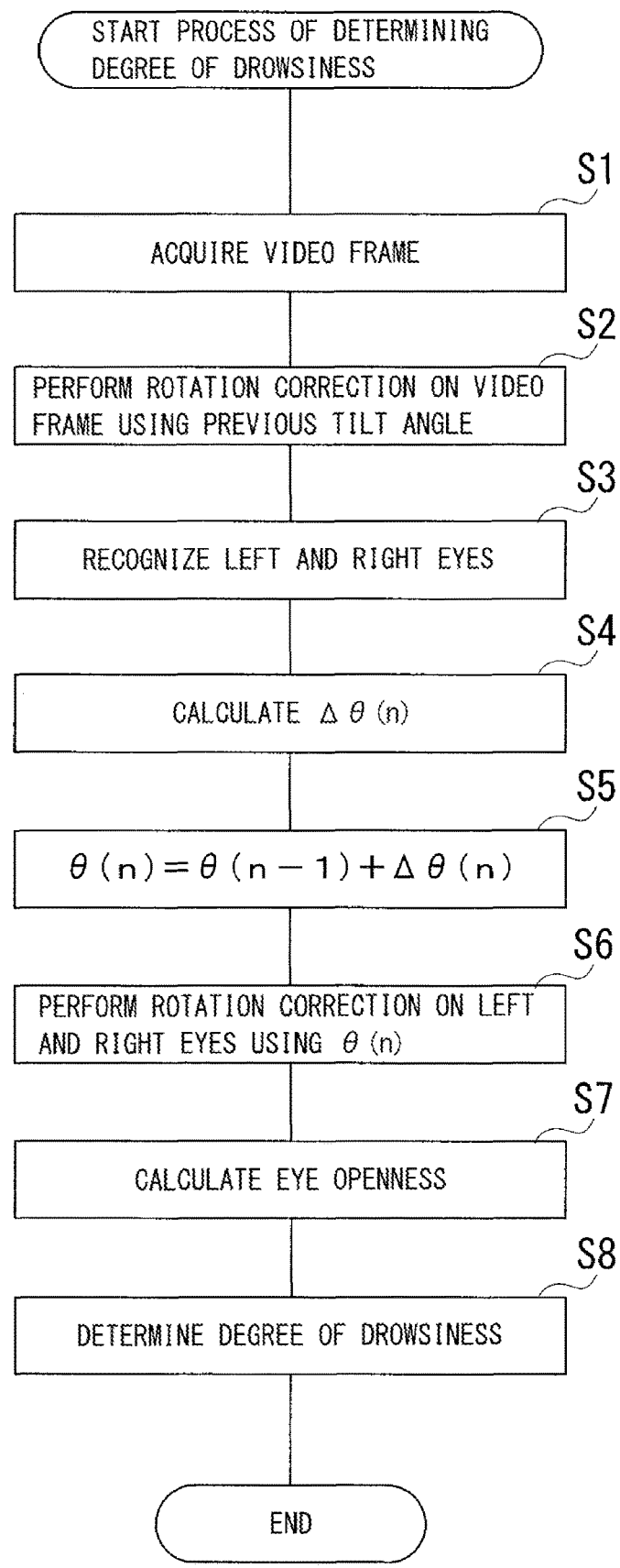
FIG. 4 is a flowchart showing a procedure for a process of determining the degree of drowsiness in the video detection device.

Next, the operation of the video detection device 30 will be described based on a process of determining the degree of drowsiness. FIG. 4 is a flowchart showing a procedure for the process of determining the degree of drowsiness in the video detection device 30. By the video acquisition interface 31 of the video detection device 30, the driver monitor 100 acquires a video frame of a video captured by the imaging interface 10 (S1).

The video recognition interface 32 performs the rotation correction on the video frame according to the previously estimated tilt angle θ(n−1) (S2) and recognizes the left and right eyes in a video (S3). When the video recognition interface 32 is in the initial state in step S2, the previously estimated tilt angle θ(n−1) may be set to 0 deg.

Figure 5:
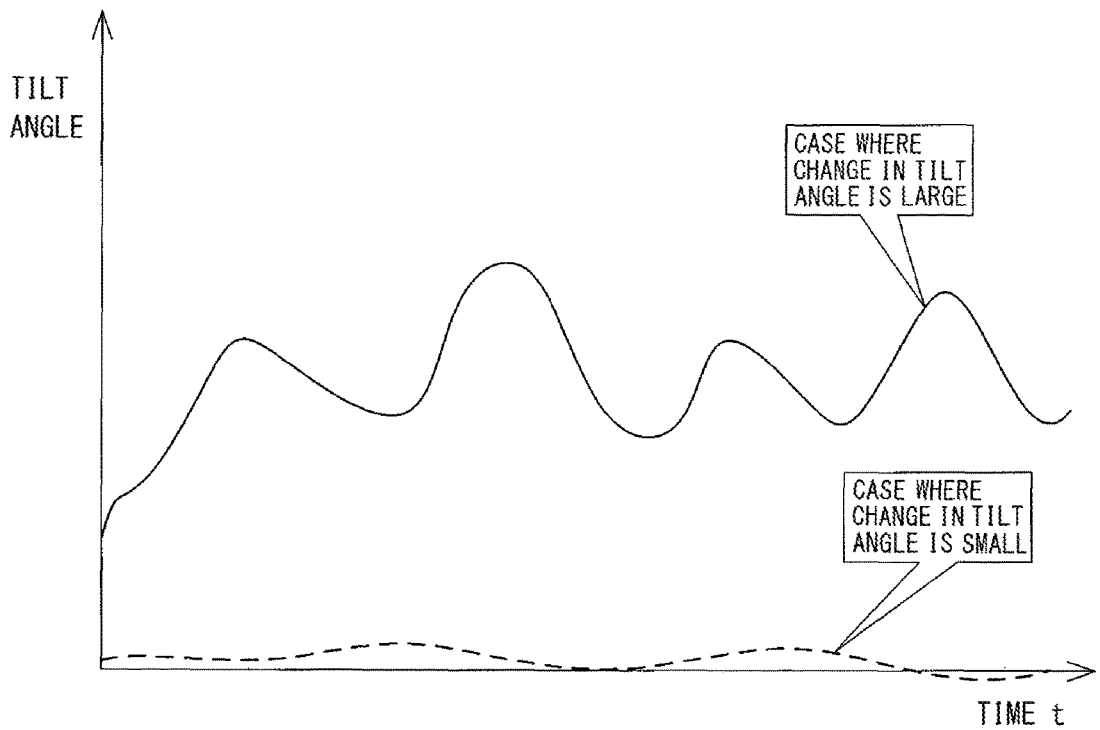
FIG. 5 is a graph showing an example of the tilt angle of the left and right eyes estimated by a tilt angle estimation interface.

The tilt angle estimation interface 33 obtains the center points P1 and P2 of the left and right eyes recognized in step S3 and calculates the amount of change Δθ(n) in the tilt angle (S4). The tilt angle estimation interface 33 estimates the tilt angle θ(n) of the left and right eyes at the present time by adding the amount of change Δθ(n) of the tilt angle to the previously estimated tilt angle θ(n−1) (S5). FIG. 5 is a graph showing an example of the tilt angle of the left and right eyes estimated by the tilt angle estimation interface 33. In FIG. 5, the horizontal axis represents time t and the vertical axis represents the tilt angle θ. Due to the estimation of the tilt angle of the left and right eyes from moment to moment by the tilt angle estimation interface 33, there arise a case where the change in the tilt angle is small, a case where the change in the tilt angle is large, and the like.

Figure 6:
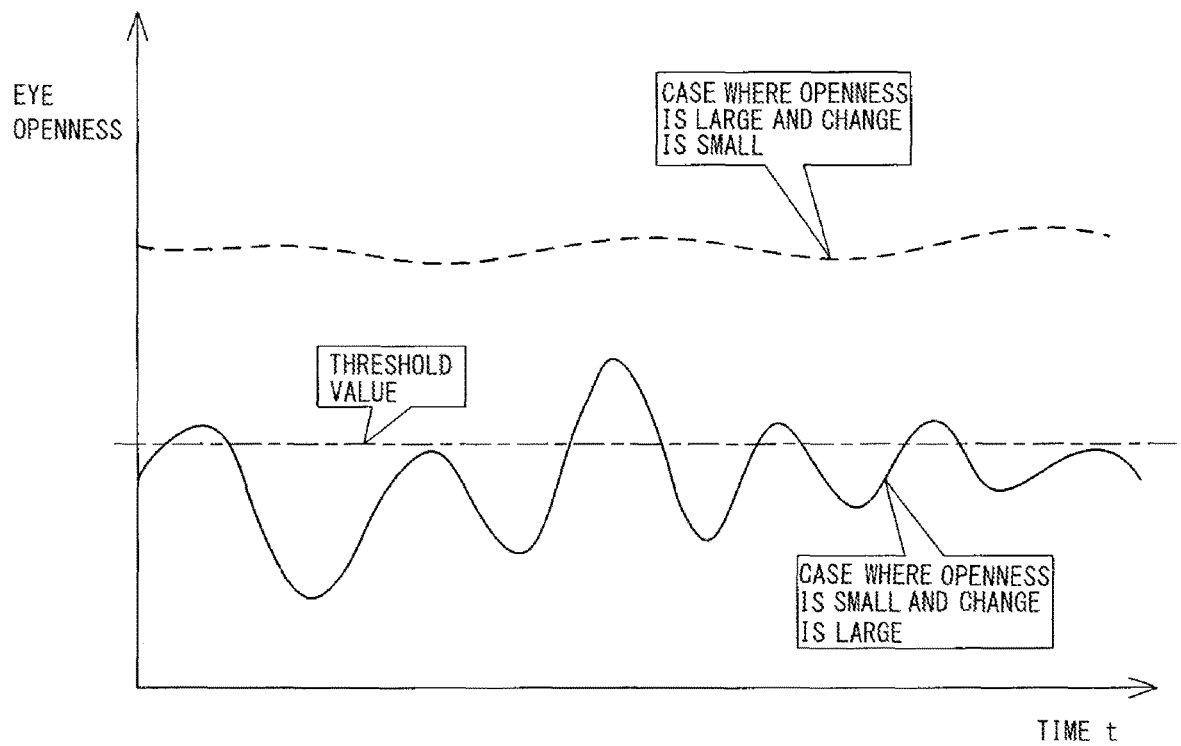
FIG. 6 is a graph showing an example of the openness of the left and right eyes calculated by an openness calculation interface.

The tilt correction interface 34 performs the rotation correction on the left and right eyes according to the current tilt angle θ(n) of the left and right eyes estimated in step S5 (S6). Due to the rotation correction performed by the tilt correction interface 34, for example, as shown in FIG. 3, the direction in which the left and right eyes are lined up becomes almost horizontal. The openness calculation interface 35 calculates the openness of the left and right eyes on which the rotation correction has been performed (S7). FIG. 6 is a graph showing an example of the openness of the left and right eyes calculated by the openness calculation interface 35. In FIG. 6, the horizontal axis represents the time t and the vertical axis represents the openness of the eyes. Due to the estimation of the openness of the left and right eyes from moment to moment by the openness calculation interface 35, there arise a case where the change in the openness is small, a case where the change in the openness is large, and the like. The openness of the eyes is calculated for each of the left eye and the right eye. The openness may be treated independently for each of the left eye and the right eye, or averaging or the adoption of either the maximum value or the minimum value may be performed.

The drowsiness determination interface 36 determines the degree of drowsiness by performing determination by comparison of the openness of the eyes calculated by the openness calculation interface 35 with a threshold value (S8) and ends the process. As shown in FIG. 6, the drowsiness determination interface 36 performs determination by comparison between, for example, one threshold value and the openness of the eyes and determines that the degree of drowsiness is "small" when the openness of the eyes is equal to or greater than the threshold value and that the degree of drowsiness is "high" when the openness of the eyes is less than the threshold value.

The video detection device 30 can acquire a video capturing the driver of the vehicle serving as an imaging subject, recognize the left and right eyes in the video, and estimate the tilt angle of the left and right eyes moment by moment. The video detection device 30 can easily calculate the openness of the eyes in an accurate manner by performing the rotation correction on the tilt of the left and right eyes by the tilt correction interface 34 and calculating the openness of the left and right eyes by the openness calculation interface 35. Further, the video detection device 30 can correct the tilting based on the estimated tilt angle of the left and right eyes and determine the degree of drowsiness as the state of the imaging subject.

Further, as described above, the tilt angle estimation interface 33 estimates the tilt angle by obtaining the change Δθ(n) of the tilt angle, that is, the difference between video frames moment by moment. The video detection device 30 can easily recognize the left and right eyes in a video by recognizing the left and right eyes in a video in a video frame whose tilting has been corrected according to the tilt angle of the immediately preceding video frame.

Further, by estimating the tilt angle by performing averaging between the video frames in the tilt angle estimation interface 33, a large movement of the left and right eyes is easily grasped even when the left and right eyes move minutely causing a slight change in the tilt angle.

Further, when at least one of the left and right eyes is not recognized by the video recognition interface 32 for a certain period of time, the tilt angle estimation interface 33 can reset the tilt angle using a tilt angle estimated based on the left and right eyes that are recognized next and recover from discontinuity or unstable state occurred in the estimation of the tilt angle.

Second Embodiment

Figure 7:
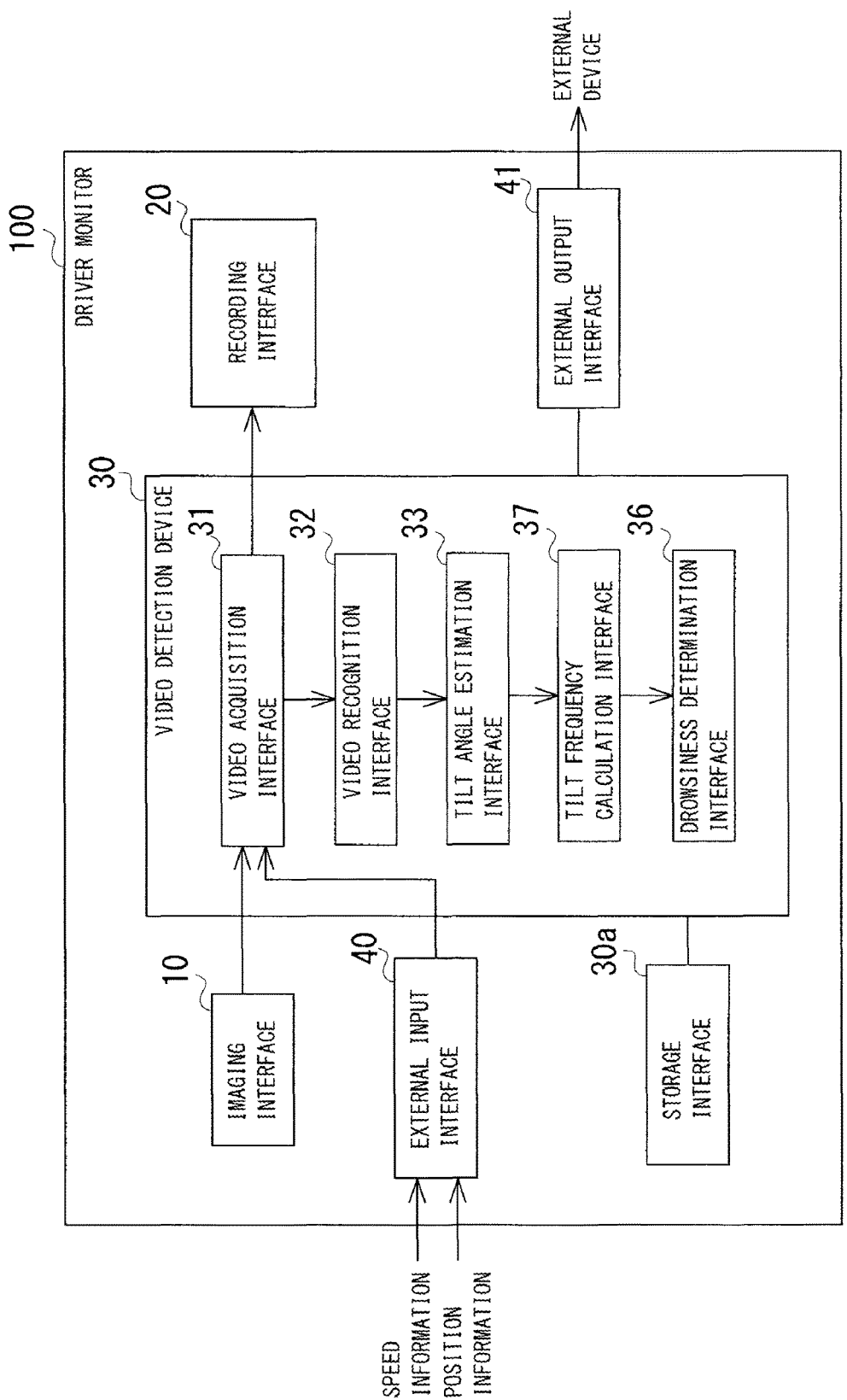
FIG. 7 is a block diagram showing the configuration of a driver monitor including a video detection device according to the second embodiment.

In the first embodiment, the degree of drowsiness as the state of an imaging subject is determined based on the openness of the left and right eyes. Alternatively, the degree of drowsiness may be determined by calculating a frequency at which the tilt angle of the left and right eyes exceeds a predetermined angle. FIG. 7 is a block diagram showing the configuration of a driver monitor 100 including a video detection device 30 according to the second embodiment. The video detection device 30 according to the second embodiment is provided with a tilt frequency calculation interface 37, and the configurations and operations other than those specifically described below are the same as the configurations and operations described in the first embodiment. Thus, the descriptions thereof are omitted for simplicity.

The tilt frequency calculation interface 37 counts the number of times the tilt angle of the left and right eyes exceeds a predetermined angle in a certain period of time and calculates the tilt frequency of the left and right eyes. The drowsiness determination interface 36 performs determination by comparison between the tilt frequency of the left and right eyes calculated by the tilt frequency calculation interface 37 and a predetermined threshold value and determines that the degree of drowsiness is "large" when the frequency is equal to or greater than the threshold value and that the degree of drowsiness is "small" when the frequency is less than the threshold value. Further, the drowsiness determination interface 36 may set a plurality of (two or more) threshold values for the tilt frequency of the left and right eyes and determine the degree of drowsiness in multiple stages. Further, the drowsiness determination interface 36 may determine the tilt frequency of the left and right eyes as the degree of drowsiness.

Further, as the tilt frequency of the left and right eyes, the tilt frequency calculation interface 37 may calculate the duty obtained by measuring a period of time during which the tilt angle of the left and right eyes exceeds the predetermined angle in a certain period of time. The determination by comparison between the tilt frequency of the left and right eyes and the predetermined threshold value by the drowsiness determination interface 36 is the same as the determination by comparison described above. Based on the duty calculated by the tilt frequency calculation interface 37, the drowsiness determination interface 36 determines that the degree of drowsiness is "large" when a period of time during which the tilt angle of the left and right eye exceeds the predetermined angle is long and that the degree of drowsiness is "small" when a period of time during which the tilt angle exceeds the predetermined angle is short.

In the first and second embodiments, examples of determining the degree of drowsiness as the state of the imaging subject are shown. Alternatively, as the state of the imaging subject that shows in the left and right eyes, the degree of anxiety and emotional joy and anger, the degree of physical fatigue, etc., may be determined.

Next, the features of a video detection device 30, a video detection method, and a video detection program according to each of the above-described embodiments will be described. The video detection device 30 according to the embodiment includes a video acquisition interface 31, a video recognition interface 32, and a tilt angle estimation interface 33. The video acquisition interface 31 acquires a video of the face of an imaging subject. The video recognition interface 32 recognizes the left and right eyes from the video acquired by the video acquisition interface 31. The tilt angle estimation interface 33 estimates a tilt angle with respect to the horizontal based on the position of the left and right eyes recognized by the video recognition interface 32. Thereby, the video detection device 30 can estimate the tilt of the left and right eyes from moment by moment from the video obtained by capturing the face of the imaging subject.

Further, the tilt angle estimation interface 33 estimates the tilt angle of the left and right eyes by obtaining the difference between video frames. Thereby, the video detection device 30 recognizes the left and right eyes in a video while correcting the tilting of the video frame, and the left and right eyes can thus be easily recognized in the video.

Further, the tilt angle estimation interface 33 estimates the tilt angle of the left and right eyes by performing averaging between the video frames. Thereby, the video detection device 30 easily grasps a large movement of the left and right eyes even when the left and right eyes move minutely causing a slight change in the tilt angle.

Further, when at least one of the left and right eyes is not recognized by the video recognition interface 32 for a certain period of time, the tilt angle estimation interface 33 resets the estimated tilt angle using a tilt angle estimated based on the left and right eyes that are recognized next. Thereby, the video detection device 30 can recover from discontinuity or unstable state occurred in the estimation of the tilt angle.

Further, the video detection device 30 includes a tilt correction interface 34 and an openness calculation interface 35. The tilt correction interface 34 corrects the tilt of the left and right eyes based on the tilt angle estimated by the tilt angle estimation interface 33. The openness calculation interface 35 calculates the openness of the left and right eyes corrected by the tilt correction interface 34. Thereby, the video detection device 30 can easily and accurately calculate the openness of the eyes after performing rotation correction on the tilt of the left and right eyes.

Further, the video detection device 30 includes a tilt frequency calculation interface 37 that calculates a frequency at which the tilt angle estimated by the tilt angle estimation interface 33 exceeds a predetermined angle. Thereby, the video detection device 30 can obtain and output the tilt frequency of the left and right eyes from an acquired video, and for example, the tilt frequency can be used for determining the degree of drowsiness of the imaging subject.

Further, the video detection device 30 includes a drowsiness determination interface 36 that determines the degree of drowsiness of the imaging subject based on the left and right eyes recognized by the video recognition interface 32. Thereby, the video detection device 30 can determine the degree of drowsiness as the state of the imaging subject.

The video detection method according to the embodiment includes a video acquisition step, a video recognition step, and a tilt angle estimation step. In the video acquisition step, a video of the face of an imaging subject is acquired. In the video recognition step, the left and right eyes are recognized from the video acquired in the video acquisition step. In the tilt angle estimation step, a tilt angle with respect to the horizontal is estimated based on the position of the left and right eyes recognized in the video recognition step. According to this video detection method, it is possible to estimate the tilt of the left and right eyes from moment by moment from the video obtained by capturing the face of the imaging subject.

A non-transitory recording medium for video detection according to the embodiment encoded with a program, the program comprising computer-implemented steps including: a computer to execute the video acquisition step, the video recognition step, and the tilt angle estimation step. In the video acquisition step, a video of the face of an imaging subject is acquired. In the video recognition step, the left and right eyes are recognized from the video acquired in the video acquisition step. In the tilt angle estimation step, a tilt angle with respect to the horizontal is estimated based on the position of the left and right eyes recognized in the video recognition step. According to the recoding medium for video detection, it is possible to estimate the tilt of the left and right eyes from moment by moment from the video obtained by capturing the face of the imaging subject.

Described above is an explanation of the present invention based on the embodiments. These embodiments are intended to be illustrative only, and it will be obvious to those skilled in the art that various modifications and changes can be developed within the scope of the claims of the present invention and that such modifications and changes are also within the scope of the claims of the present invention. Therefore, the descriptions and figures in the specification should be treated demonstratively instead of being treated in a limited manner.

What is claimed is:

1. A video detection device comprising:
   a video acquisition interface that acquires a video in which a face of an imaging subject is captured;
   a video recognition interface that recognizes the left and right eyes in the video acquired by the video acquisition interface; and
   a tilt angle estimation interface that estimates a tilt angle with respect to a horizontal based on the position of the left and right eyes recognized by the video recognition interface, wherein
   when at least one of the left and right eyes is not recognized by the video recognition interface for a certain period of time, the tilt angle estimation interface resets the estimated tilt angle using a tilt angle estimated based on the left and right eyes that are recognized next.

2. The video detection device according to claim 1, wherein the tilt angle estimation interface estimates the tilt angle by practicing at least one of obtaining a difference between video frames and performing averaging between the video frames.

3. The video detection device according to claim 1, comprising:
   a tilt correction interface that corrects a tilt of the left and right eyes based on the tilt angle estimated by the tilt angle estimation interface; and
   an openness calculation interface that calculates an openness of the left and right eyes corrected by the tilt correction interface.

4. The video detection device according to claim 1, comprising:
   a drowsiness determination interface that determines a degree of drowsiness of the imaging subject based on the left and right eyes recognized by the video recognition interface.

5. A video detection device according to claim 1, comprising:

a tilt frequency calculation interface that calculates a frequency at which the tilt angle estimated by the tilt angle estimation interface exceeds a predetermined angle.

6. The video detection device according to claim 5, comprising:
a drowsiness determination interface that determines a degree of drowsiness of the imaging subject based on the left and right eyes recognized by the video recognition interface.

7. A video detection method comprising:
acquiring a video in which a face of an imaging subject is captured;
recognizing the left and right eyes in the video acquired in the acquiring a video; and
estimating a tilt angle with respect to a horizontal based on the position of the left and right eyes recognized in the recognizing the left and right eyes in the video, wherein
when at least one of the left and right eyes is not recognized in the recognizing the left and right eyes for a certain period of time, the tilt angle is reset in the estimating a tilt angle by using a tilt angle estimated based on the left and right eyes that are recognized next.

* * * * *